UNITED STATES PATENT OFFICE.

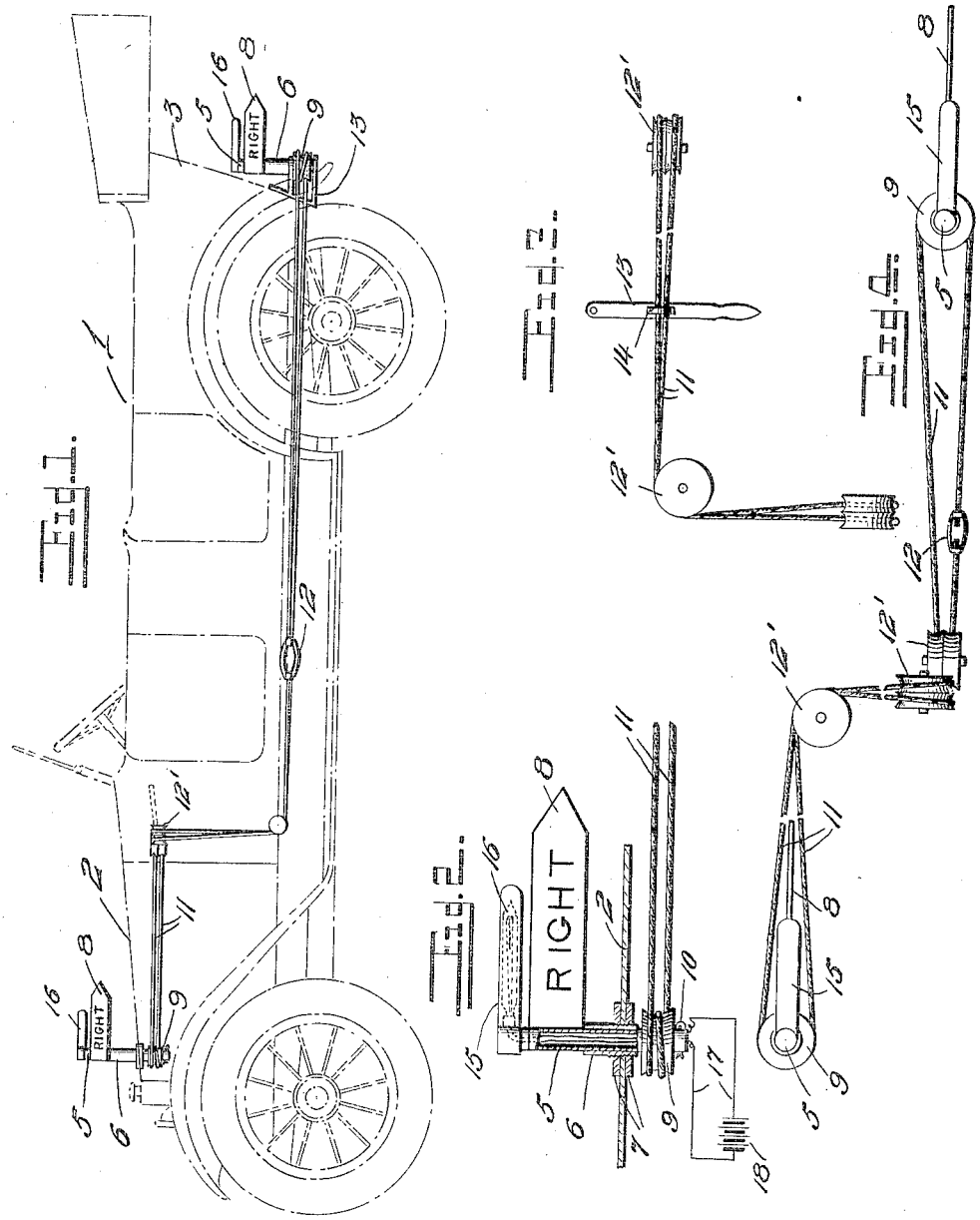

GEORGE E. WHITE, OF MISHAWAKA, INDIANA.

VEHICLE DIRECTION-SIGNAL.

1,319,548. Specification of Letters Patent. Patented Oct. 21, 1919.

Application filed August 8, 1918. Serial No. 248,917.

*To all whom it may concern:*

Be it known that I, GEORGE E. WHITE, a citizen of the United States, residing at Mishawaka, Indiana, have invented certain new and useful Improvements in Vehicle Direction-Signals, of which the following is a specification, reference being had therein to the accompanying drawing.

This invention relates to signals for vehicles. It is especially adapted for use in indicating the direction which the operator of a vehicle intends to take, and it is contemplated among the objects of the invention to provide a device of this character which may be readily applied to and detached from a vehicle without the assistance of skilled labor; which will have few parts; which may be illuminated at night and so placed upon a vehicle that it can be readily seen from almost any view point; and which will, in a word provide a neat and practical device for this purpose.

Still a further object of the invention is to provide a direction indicating device which will give a signal in duplicate from various points on a vehicle, the arrangement of the working parts being such that these signals may be positioned at various points without changing the nature of the operating means thus affording a wide variety of working condition under which they may be used without materially changing the connections and operation.

Other objects and advantages will in part be apparent, and in part be brought out more fully in the description which follows.

A drawing illustrating an embodiment of the invention is hereto annexed, the following views being shown:—

Figure 1, is a view in side elevation illustrating the application of the invention to a motor vehicle;

Fig. 2, is a similar view in detail of a part, a portion thereof being shown in section;

Fig. 3, is a view in top plan showing an arrangement of the connecting means; and Fig. 4, is a similar view of the entire system.

In these drawings, 1 designates a vehicle, having a hood 2, and body 3 to which my invention is applicable.

It comprises direction signal members 4 adapted to be attached to the vehicle at suitable locations, preferably in spaced apart relation and operable from a central or control point to indicate the direction the aperator intends the vehicle to take.

Each direction signal member comprises a supporting stem or standard 5, rotatably mounted in a collar or the like 6, the latter having its outer surface threaded for a distance for the reception of clamping members 7, adapted to secure the collar and stem rigidly to a portion of the vehicle such as the hood 2, or a bracket as desired.

Upon the upper portion of the stem or standard 5 there is a vane or the like 8 bearing the direction designations:— "Right" on one side and "Left" on the other as here shown, and means are provided for operating the vanes, preferably simultaneously and in unison from a point of control.

For this purpose, and as here shown, the lower portion of each stem is extended beyond the lower end of the collar 6, and upon this lower portion of the stem there is mounted a pulley 9 adjustable thereon as by a set screw 10, the arrangement being such that the vane at the upper end and the pulley at the lower end of the stem press against the upper and lower extremities of the collar and prevent any rattling or lost motion between these parts. An additional locking means is provided for the pulley, and as here shown a cotter pin 10 is placed below the pulley on the lower extremity of the standard 5.

Vane operating means 11, here shown as a rope or the like is wound tightly around each pulley and maintained taut therearound so that both vanes will operate together. For the purpose of maintaining the rope taut and permitting adjustment thereof, a turnbuckle 12 is provided. The rope is of the endless variety, and is directed to any preferable part of the vehicle by means of direction pulleys 12′ which may be changed about as circumstances require. As here shown one of the signals is located on the hood just back of the radiator, the other being supported on a bracket 13 located on the rear of the body 3. The direction pulleys carry the rope through the hood to the instrument board or some such location near the driver's seat, from whence it is carried, as shown in Fig 3, to the edge of the vehicle thence down and back to the signal on the bracket.

Means are provided for operating the rope from the driver's seat or the like, and as here shown a lever 13 is secured at one end to a portion of the vehicle, and has intermediate its ends a clamping member 14 which securely holds one of the strands of the rope. It will be seen that movement of this lever will be communicated, through the rope to whatever number of signals and pulleys are supplied, and will operate them simultaneously either to the left or the right as circumstances may require. When running straight ahead the resistance of the wind will maintain the signals in their central or inoperative position.

Means are provided for illuminating the signals and as here shown a reflector or the like 15 is mounted at one end upon the stem or standard 5, and extending along the upper edge of the vane 8. A light 16 within the reflector may be connected by wiring 17 with a source of electricity 18 such as the lighting system of the car.

From the foregoing it will be apparent that the present invention provides simple practical means of effecting the objects stated, and it will be understood that many changes may be made in the general arrangement without departing from the scope as set forth in the claims.

What I claim is:—

1. A direction signal for vehicles and the like comprising a sleeve member adapted to be secured to a vehicle; a standard rotatably mounted in said sleeve; a signal vane mounted on one end of the standard, said vane having a bearing on the sleeve and preventing movement of the standard in one direction; and a vane moving member secured to the other end of the standard, said member also having a bearing on the sleeve and preventing movement of the standard in the opposite direction.

2. A direction signal for vehicles and the like comprising a sleeve member adapted to be secured to a vehicle; a hollow standard, rotatably mounted in the sleeve; a signal vane mounted on one end of the standard, said vane having a bearing on one end of the sleeve and preventing movement of the standard axially in one direction; a vane moving member mounted on the other end of the standard, said member also having a bearing on the opposite end of the sleeve and preventing movement of the standard axially in the other direction; and a light carrying member disposed on the outer end of the standard and closing the opening therein.

In testimony whereof I hereunto affix my signature.

GEORGE E. WHITE.